UNITED STATES PATENT OFFICE.

JUAN ANIBAL DOMINGUEZ, OF BUENOS AIRES, ARGENTINA.

DYEING PROCESS.

1,121,720. Specification of Letters Patent. Patented Dec. 22, 1914.

No Drawing. Application filed October 9, 1911, Serial No. 653,737. Renewed July 16, 1914. Serial No. 851,429.

*To all whom it may concern:*

Be it known that I, JUAN ANIBAL DOMINGUEZ, a citizen of Argentina, residing at Buenos Aires, Argentina, have invented a certain new and useful Dyeing Process.

This invention relates to a new method for dyeing articles by means of a natural dye extracted from wood or from the sawdust of said wood.

An object of the invention is to utilize chemical extracts of the exudations and the sawdust of the algarroba tree for dyeing purposes.

Other objects will be more clearly understood from the following specification and from the appended claim.

The exudations of the algarroba tree (*Prosopis alba* and *Prosopis nigrum*) can be used as dye stuffs in a similar manner as the exudations of the quebracho oak (*Loxopterygium Lorentzii*). The exudations of these trees are distinguished by their tannic acid and have been used for dyeing as well as for tanning purposes. These exudations, usually called catechin, contain catechin acid. In analyzing the kino, or exudation of the white algarroba tree, I found that the same has the following composition: water, 11.149%; ash, 10.212%; tannic acid, 16.240%; catechin, coloring and extracting matter, 28.420%; "globafenos," 10.170%; insoluble residue, 23.809%.

In applying the same for industrial purposes the exudations in mixture with the sawdust of the tree may be used for obtaining the following coloring: First: the kino and extract of sawdust of the algarroba tree with a solution of chlorid and carbonate of soda will furnish a wine red coloring. Second: the same substance in combination with copper sulfate will furnish dark brown coloring. Third: the same substance in combination with potassium bi-chromate will give a brown coloring. Fourth: with a solution of sub-acetate of lead, a slate gray coloring may be obtained. Fifth: the same substance with a potassium bisulfate will give a reddish brown tint.

In the following I have illustrated by way of example a method for coloring textile fabrics a reddish brown tint. The method is the following: The kino of the algarroba tree is dissolved in water or an aqueous extract of the sawdust of the tree may be used. The material to be dyed the fibers of which may be wool, silk or cotton, are immersed in this solution or extract for a period of fifteen minutes. It is then removed from this solution and treated, preferably also for a period of fifteen minutes, in a solution of bi-sulfate of potassium and perchlorid of iron. This last named solution has a temperature of 70 to 80 centigrades. The material is then removed from the second solution and washed.

The composition of the second bath for the material is given in the following: bisulfate of potassium, 15 grs.; per-chlorid of iron, (a 20% solution,) 20 drops; water, 100 c. c.

Another way of applying the dye to the material is given in the following method: The material to be treated is immersed in a solution of alum having a strength of 5% and a temperature of 70 to 80 degrees centigrade. After having been left in this solution for fifteen minutes the material is withdrawn and washed in water for a like period. It is then immersed for fifteen minutes in a solution of kino of the algarroba tree in water or in an aqueous extract of the sawdust of the tree. After this treatment the material may be washed again and may be immersed afterward in a cold bath consisting of a 10% aqueous solution of potassium bi-chromate. After being treated in the second solution for fifteen minutes it is removed, washed and dried.

I claim:

A method of dyeing material which comprises immersing the material to be dyed in an aqueous solution of the kino of the algarroba tree (*Prosopis alba* or *Prosopis nigra*), washing the material and immersing the same in a solution of metallic salts in water.

In testimony whereof I affix my signature in presence of two witnesses.

JUAN ANIBAL DOMINGUEZ.

Witnesses:
 José A. GUIÑAZÚ,
 ELI TAYLOR.

Copies of this patent may be obtained for five cents each, by addressing the "Commissioner of Patents, Washington, D. C."